United States Patent
Patel et al.

(10) Patent No.: US 12,422,097 B2
(45) Date of Patent: Sep. 23, 2025

(54) MOBILE LIQUID HYDROGEN RECHARGER

(71) Applicant: Taylor-Wharton America Inc., Baytown, TX (US)

(72) Inventors: Devang Patel, Baytown, TX (US); Ashwin Patel, Baytown, TX (US); Hector Villarreal, Baytown, TX (US)

(73) Assignee: TAYLOR-WHARTON AMERICA INC., Baytown, TX (US)

(*) Notice: Subject to any disclaimer, the term of this patent is extended or adjusted under 35 U.S.C. 154(b) by 575 days.

(21) Appl. No.: 17/682,899

(22) Filed: Feb. 28, 2022

(65) Prior Publication Data

US 2022/0299165 A1 Sep. 22, 2022

Related U.S. Application Data

(60) Provisional application No. 63/154,347, filed on Feb. 26, 2021.

(51) Int. Cl.
F17C 5/02 (2006.01)

(52) U.S. Cl.
CPC .......... F17C 5/02 (2013.01); *F17C 2221/012* (2013.01); *F17C 2223/013* (2013.01); *F17C 2223/033* (2013.01); *F17C 2225/0123* (2013.01); *F17C 2225/036* (2013.01); *F17C 2227/0185* (2013.01); *F17C 2227/0304* (2013.01); *F17C 2265/063* (2013.01)

(58) Field of Classification Search
CPC ............. F17C 5/02; F17C 2221/012; F17C 2223/013; F17C 2223/033; F17C 2225/0123; F17C 2225/036; F17C 2227/0185; F17C 2227/0304; F17C 2265/063

USPC ......................................................... 62/50.2
See application file for complete search history.

(56) References Cited

U.S. PATENT DOCUMENTS

| | | | |
|---|---|---|---|
| 4,211,537 A | 7/1980 | Teitel | |
| 6,354,088 B1 | 3/2002 | Emmer et al. | |
| 6,622,758 B2 | 9/2003 | Drube et al. | |
| 8,091,593 B2 * | 1/2012 | Allidieres | F17C 13/025 141/82 |
| 9,404,443 B2 | 8/2016 | Mcalister | |
| 9,964,073 B1 | 5/2018 | Pinera et al. | |

(Continued)

FOREIGN PATENT DOCUMENTS

| | | |
|---|---|---|
| JP | 6249905 B2 | 12/2017 |
| WO | 2015066651 A1 | 5/2015 |

*Primary Examiner* — Steve S Tanenbaum
(74) *Attorney, Agent, or Firm* — Merchant & Gould, P.C.

(57) ABSTRACT

In one aspect of the invention, the system may include a liquid hydrogen storage tank that is placed on a mobile carriage. From the liquid hydrogen storage tank, a submerged pump feeds low-pressure liquid hydrogen to a second pump that is external to the tank. This second pump then increases the pressure of the liquid hydrogen and feeds the liquid hydrogen to a vaporizer system. The vaporizer system includes coolant, a coolant tank, a load bank, a third pump, and a diffusion bonded compact heat exchanger (DCHE) to transfer heat from the coolant to the liquid hydrogen. To further help heat the coolant, heat exchangers may be included to cool systems of the vehicle and recover waste engine heat. After the vaporizer converts the liquid hydrogen to its gaseous form, the gaseous hydrogen is discharged to an external vehicle or tank.

20 Claims, 9 Drawing Sheets

(56) References Cited

U.S. PATENT DOCUMENTS

| | | | |
|---|---|---|---|
| 10,030,613 B2* | 7/2018 | Melanson | F02M 31/166 |
| 10,890,293 B2 | 1/2021 | Gustafson | |
| 2015/0276130 A1 | 10/2015 | Hall et al. | |
| 2020/0025163 A1* | 1/2020 | Lee | F02M 21/0245 |
| 2020/0095113 A1* | 3/2020 | Crispel | B67D 7/36 |
| 2021/0010641 A1* | 1/2021 | Kim | F17C 5/06 |

* cited by examiner

MOBILE LIQUID HYDROGEN RECHARGER

CROSS-REFERENCE TO RELATED APPLICATIONS

The present application claims priority from U.S. Provisional Patent Application No. 63/154,347, filed on Feb. 26, 2021, the disclosure of which is hereby incorporated by reference in its entirety.

BACKGROUND

Hydrogen has proven to be a useful fuel source for a variety of applications. For example, some municipal and commercial fleet vehicles, as well as passenger vehicles, use hydrogen as a fuel source. To service such vehicles, hydrogen fueling stations have been created which include bulk tanks of hydrogen gas at relatively high volume and very high pressure. Vehicles may be recharged by connecting to such bulk tanks. Based on a pressure differential between a vehicle fuel tank and the bulk tank, vehicles may be refueled with hydrogen gas.

Periodically, bulk tanks of hydrogen gas at such refueling stations are required to be "recharged". That is, since a vehicle refueling process involves removal of some of the hydrogen gas from the bulk tanks, the pressure of gas storage tanks or tubs gradually reduces. Accordingly, it is periodically required to provide additional hydrogen gas to those bulk tanks to maintain a high pressure in the tank. This ensures adequate refueling of vehicles serviced from such bulk tanks.

Existing liquid hydrogen delivery systems typically involve mobile recharger systems in the form of a vehicle-mounted hydrogen gas tank that maintains hydrogen gas at a very high pressure. Such a mobile recharger system may travel to the site of a bulk tank, so that the vehicle-mounted hydrogen gas tank can be fluidically connected to the bulk tank or tanks at the refueling station. Once the vehicle-mounted hydrogen gas tank is fluidically connected to the bulk tank to be recharged, the pressure gradient between those tanks causes the bulk tank to receive gas, and thereby increase in pressure (e.g., causing the pressure differential between the bulk tank and the vehicle-mounted hydrogen tank to be reduced).

This arrangement has significant limitations. For example, when a vehicle-mounted hydrogen gas tank is fluidically connected to a given bulk tank, the bulk tank may only be "refilled" to a point of pressure equalization between the vehicle-mounted hydrogen gas tank and the bulk tank. This may occur, for example, when the bulk tank reaches half capacity. The vehicle-mounted hydrogen gas tank must then be recharged itself before being able to recharge other bulk tanks. This arrangement results in significant inefficiencies. For example, a vehicle carrying or towing a vehicle-mounted hydrogen gas tank often needs to make many trips between sites of bulk tanks and a site at which the vehicle-mounted hydrogen tank itself may be recharged. The vehicle may need to continually drop and or switch trailers to collect full mobile gas recharging units at a gas source for single-use discharge at destination bulk tanks to be recharged, thereby slowing the bulk tank recharging process significantly.

It is with respect to these and other general considerations that example aspects, systems, and methods have been described. Also, although relatively specific problems have been discussed, it should be understood that the examples should not be limited to solving the specific problems identified in the background.

SUMMARY

The present disclosure is generally directed to a system and method for a mobile liquid hydrogen recharger. Further, it includes a method of use for the mobile liquid hydrogen recharger to refill bulk stations. The recharger system described herein can transport liquid hydrogen to remote bulk tanks and dispense gaseous hydrogen to the bulk tank without requiring pressure equalization between the recharger's mobile tank and the bulk tank. Rather, a bulk tank may be repressurized by hydrogen gas formed by evaporation of some of the hydrogen liquid in the mobile tank, thereby pressurizing supply lines between the mobile tank and bulk tank, and creating a pressure differential useable for recharging the bulk tank.

In one aspect of the invention, the mobile liquid hydrogen recharge system includes a vehicle-mounted tank for storing liquid hydrogen, the tank having an interior volume. The system further includes a first pump contained within the tank and a second pump external to the tank. The system further includes a first fluid conduit fluidically connected between the first pump and the second pump and a second fluid conduit fluidically connected between the second pump and an outlet. The system further includes a vaporizer fluidically connected along the second conduit downstream of the second pump external to the tank, the vaporizer having a heat transfer fluid circuit, wherein the vaporizer is operable to raise a temperature of the liquid hydrogen received downstream of the second pump from a temperature that is below an evaporation point of the liquid hydrogen to a temperature above the evaporation point of the liquid hydrogen, thereby converting the liquid hydrogen to a hydrogen gas. The system further includes a discharge valve fluidically connected between the second pump and the outlet downstream of the vaporizer along the second conduit.

In a second aspect, a method of operation for a mobile hydrogen recharger system is disclosed. The method includes opening a valve fluidically connected along a first conduit between a first pump within a vehicle-mounted tank containing liquid hydrogen and a second pump external to the vehicle-mounted tank. The method further includes actuating the first pump to deliver the liquid hydrogen from the first pump to the second pump and actuating the second pump to deliver the liquid hydrogen from the second pump to a vaporizer along a second conduit. The method further includes heating the liquid hydrogen at the vaporizer until it reaches an evaporation point and becomes hydrogen gas and discharging the hydrogen gas through an outlet downstream of the vaporizer along the second conduit to an external source.

In a third aspect, a method for recharging hydrogen bulk stations is disclosed. The method includes transporting a mobile hydrogen recharge system including a mobile tank containing liquid hydrogen in the mobile tank to a first bulk tank and performing a first bulk tank recharge process at the first bulk tank. The method includes fluidically connecting the first bulk tank to an outlet of the mobile hydrogen recharge system and pumping liquid hydrogen in the mobile tank from a first pump to a second pump. The method further includes pumping the liquid hydrogen to a vaporizer from the second pump and raising the temperature of the liquid hydrogen at the vaporizer to a temperature above an evaporation point from a temperature below the evaporation point, thereby converting the liquid hydrogen to a hydrogen gas. The method further includes discharging the hydrogen gas through the outlet to the first bulk tank.

BRIEF DESCRIPTIONS OF THE DRAWINGS

DETAILED DESCRIPTION

As briefly described above, the disclosed invention relates to a mobile hydrogen liquid recharger. In example aspects, the mobile liquid hydrogen recharger may be vehicle-mounted or vehicle-towable, and is movable to locations of hydrogen gas bulk tanks. In such example aspects, the mobile liquid hydrogen recharger can be used to fill one or multiple bulk tanks located at different locations. The mobile liquid hydrogen recharger may include a mobile tank that maintains hydrogen in liquid form for mobile transport, e.g., on a carriage or other vehicle-mounted or vehicle-towable platform. A pump positioned within the mobile tank and a second pump external to the mobile tank cooperate to control dispensing of the liquid hydrogen from the mobile tank. Optionally, a heat exchange system, such as a vaporizer, may be used to convert the liquid hydrogen to hydrogen gas. A valve and fluid connector downstream of the vaporizer may be used to maintain pressurization of the hydrogen gas and control delivery to a hydrogen gas bulk tank. This will allow the system to hydrogen gas without significant decrease in hydrogen gas pressure within the mobile tank, since the mobile tank stores liquid hydrogen and converts it to a pressurized gas for delivery to a bulk tank, thereby avoiding the pressure equalization and refill/recharging issues identified above.

Figure 1:
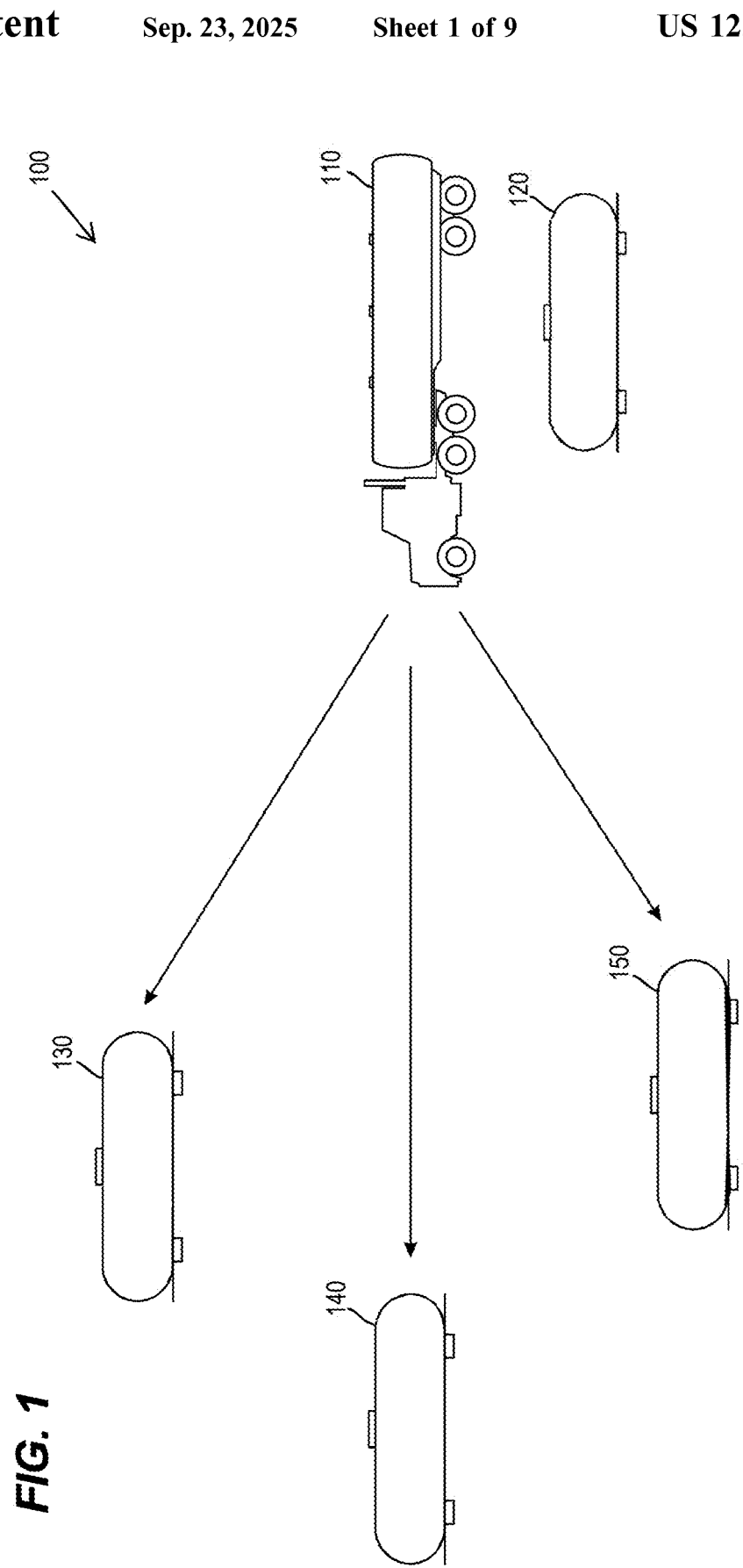
FIG. 1 is an example system in which a mobile liquid hydrogen recharger can be used.

FIG. 1 consists of system 100, including a mobile liquid hydrogen recharger 110, a source tank 120, and a plurality of bulk tanks 130, 140, and 150. The example system of FIG. 1 shows one embodiment of how the mobile liquid hydrogen recharger 110 is used.

In example embodiments, the source tank 120 may contain a supply of liquid hydrogen. The source tank may be fluidically connectable to the mobile liquid hydrogen recharger 110 as described below to refill a mobile tank of the mobile liquid hydrogen recharger 110 with liquid hydrogen.

Each of the plurality of bulk tanks 130, 140, 150 may be located at different, geographically dispersed locations. Accordingly, the mobile liquid hydrogen recharger 110 may travel to each of a plurality of geographically dispersed locations without returning to the source tank 120 for recharging or re-pressurizing a mobile tank between refill operations. Rather, because the mobile tank maintains the source hydrogen in liquid form, and forms a pressurized hydrogen gas at the time the liquid hydrogen is provided to each of the bulk tanks, the need for repressurization is avoided, and the required volume for storing liquid hydrogen is far lower, thereby allowing for improved convenience and efficiency.

In example embodiments, the mobile liquid hydrogen recharger 110 may be implemented as mounted on a vehicle body directly. In alternative embodiments, the mobile liquid hydrogen recharger 110 may be implemented as mounted on a flatbed trailer, for example as seen in the example of FIGS. 2-4B.

In operation, a mobile liquid hydrogen recharger 110 will be prepared at a source location by filling up its tank with a supply of liquid hydrogen from a source tank 120. In some examples, the recharger 110 can draw the liquid hydrogen from the source tank 120 using a pressure transfer process, or pump, provided at the source location. Liquid hydrogen is then delivered through an external refill port (an example of which is seen in FIGS. 2-4B, below) to an inlet at the lower part of the tank that leads to the inside volume of the tank. In a different embodiment, the source tank 120 has its own pump that dispenses the liquid hydrogen into the mobile recharger 110. Also, source tank 120 can be one large tank at a central location, or multiple connected tanks that all store liquid hydrogen.

Once the mobile liquid hydrogen recharger 110 has a supply of liquid hydrogen within its mobile tank, the mobile liquid hydrogen recharger 110 will be relocated to a remote location, e.g., to a first bulk tank 130. Once there, the mobile recharger 110 will perform a first bulk tank recharge process at the first bulk tank 130. An example of a bulk tank recharge process is described in further detail below, in conjunction with FIGS. 5-7.

After filling up the first bulk tank 130 with hydrogen gas, the mobile liquid hydrogen recharger 110 may transport the mobile hydrogen recharge system from the first bulk tank 130 to a second bulk tank 140. The second bulk tank 140 can be in a different location from the first bulk tank 130. Then, without refilling the mobile tank (e.g., from the source tank 120 or otherwise), the mobile liquid hydrogen recharger 110 is able to perform a second bulk tank recharge process at the second bulk tank 140. Additionally, mobile liquid hydrogen recharger 110 may be relocated to third bulk tank 150 to perform a further bulk tank recharge process. In another embodiment, the mobile recharger will go to more bulk tanks. Also, the present invention should not be seen as limited to bulk tanks. In a different embodiment, one or more of the bulk tanks may be a different hydrogen storage system, such as may be used at a hydrogen vehicle refueling station. In a still further embodiment, one or more of the tanks refilled via the bulk tank recharge process may be a commercial vehicle or piece of equipment that is fueled by hydrogen. The mobile recharger 110 can discharge hydrogen directly to the commercial vehicle or piece of equipment.

Figure 2:
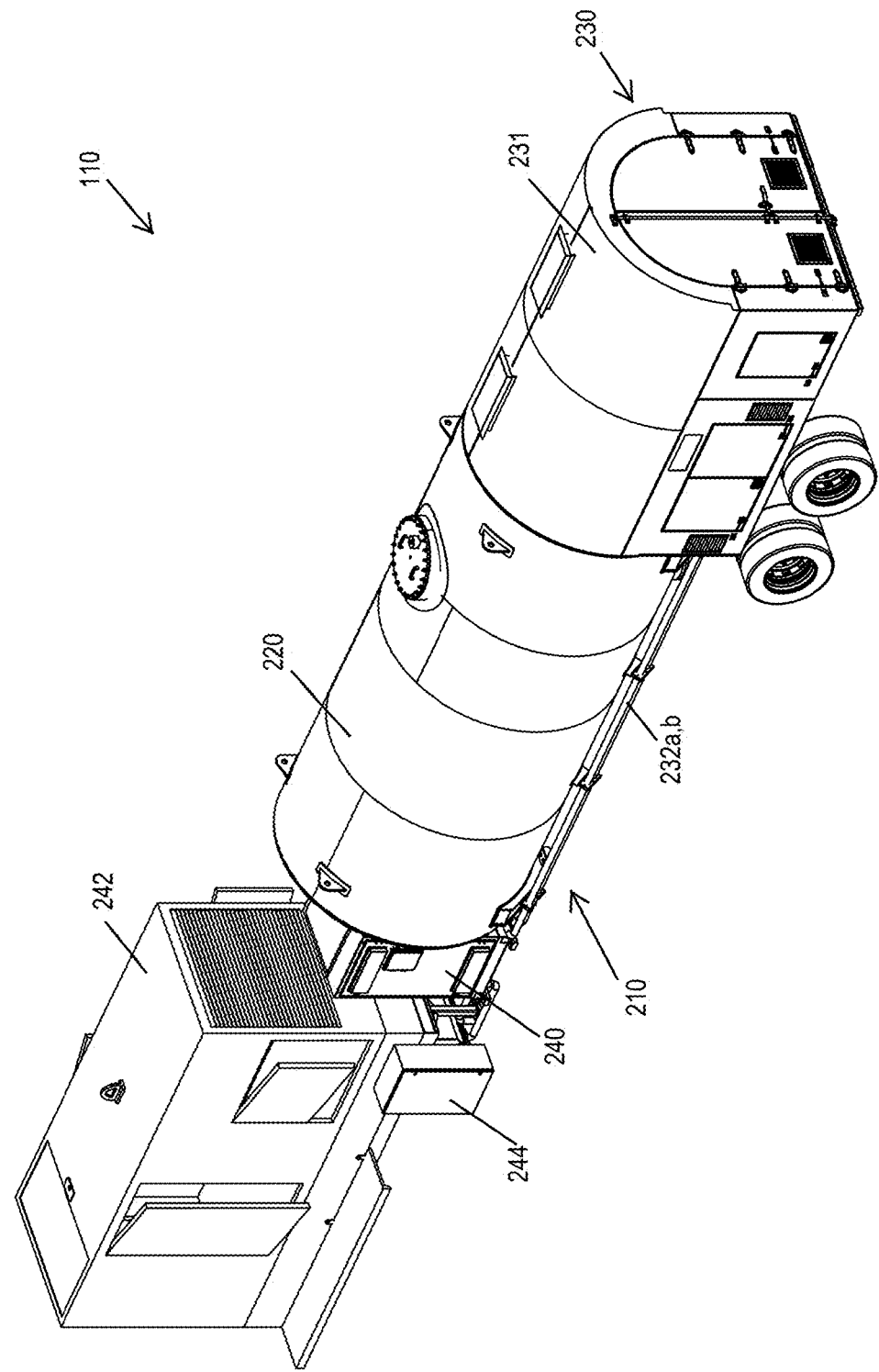
FIG. 2 is an example perspective view of a mobile liquid hydrogen recharger according to an example embodiment of the present disclosure.

FIGS. 2-4B show different perspective views of an example embodiment of the mobile liquid hydrogen recharger 110. FIG. 2 shows a perspective view of an example embodiment of mobile recharger 110, according to an example embodiment in which the mobile liquid hydrogen recharger 110 is implemented as a trailer-based mobile system. In the example shown, the mobile liquid hydrogen recharger 110 includes a carriage 210, a mobile tank 220, a dispensing system 230, a load bank 240, and discharge outlet 250.

As previously noted, in some embodiments, carriage 210 may be a towed platform or a self-powered vehicle. The carriage 210 can also include a trailer that the rest of the system is placed on and is connectable to other vehicles, or it could include multiple trailers.

In the example shown, the mobile tank 220 is mounted to, and housed on, the carriage 210. As seen in further detail in FIG. 5, below, liquid hydrogen and an internal pump are positioned within the inner volume of the tank. In example embodiments, the mobile tank 220 is an insulated tank (e.g. vacuum insulated) of adequate size to store sufficient liquid hydrogen to perform a recharging operation at a bulk tank. In example implementations, the mobile tank 220 may have a gross liquid capacity of between 3,500 and 4,000 gallons, for example approximately between 3,600 and 3,700 gallons. In other examples, the mobile tank 220 may have a gross liquid capacity of up to 8,000 gallons.

In the example shown, also located on carriage 210 is load bank 240. Load bank 240 is used to increase the temperature of a heat transfer fluid, which may be provided to the dispensing system (e.g., to a vaporizer included thereon as described below) for converting liquid hydrogen to hydrogen gas for dispensing to bulk tanks 130, 140, 150, etc.

In the example shown, the dispensing system 230 is fluidically connected to the mobile tank 220. The dispensing system 230 is optionally maintained within an enclosure 231. The dispensing system 230 is fluidically connected to the load bank 240 via fluid lines 232a-b, which supply heat transfer fluid to vaporizer 236 seen below. After pumping hydrogen to the dispensing system 230, the dispensing system 230 can vaporize the liquid hydrogen and discharge gaseous hydrogen through outlet 250 (seen in FIG. 4B). In different embodiments, the outlet can be attached to the system at a different location.

The load bank 240 provides electric heat to be applied to the heat transfer fluid utilized by the mobile liquid hydrogen recharger 110. A heated heat transfer fluid may be provided from the load bank 240 to the dispensing system 230, and in particular to the vaporizer 236 as noted above. Heat transfer fluid that has been cooled within the vaporizer 236 returns to the load bank 240 for reheating and reuse.

The load bank 240 can increase the temperature of a heat transfer fluid to an adequate temperature. Heaters within the load bank may use electrical energy from the generator 252 to raise the temperature of the heat transfer fluid. For example, an electrical heater or some other kind of electrical device for heating can be used. In another embodiment, waste engine heat is used to raise the temperature of the heat transfer fluid at the load bank 240. While not shown, in implementations that are vehicle-mounted, an engine of the vehicle may be thermally connected to the heat exchangers or the load bank 240 so heat can be transferred from a vehicle engine to the heat transfer fluid. Both electrical energy and waste engine heat can be used in combination as well.

In the example implementation shown, a generator 242 may provide electrical power for control of and operation of various pumps included within the mobile liquid hydrogen recharger 110. A control box 244 contains a control system powered by the generator 242, and providing control inputs to various valves, as well as the load bank 240 and vaporizer 236. In examples, the control system may implement the process described below in conjunction with FIG. 6.

Figure 3:
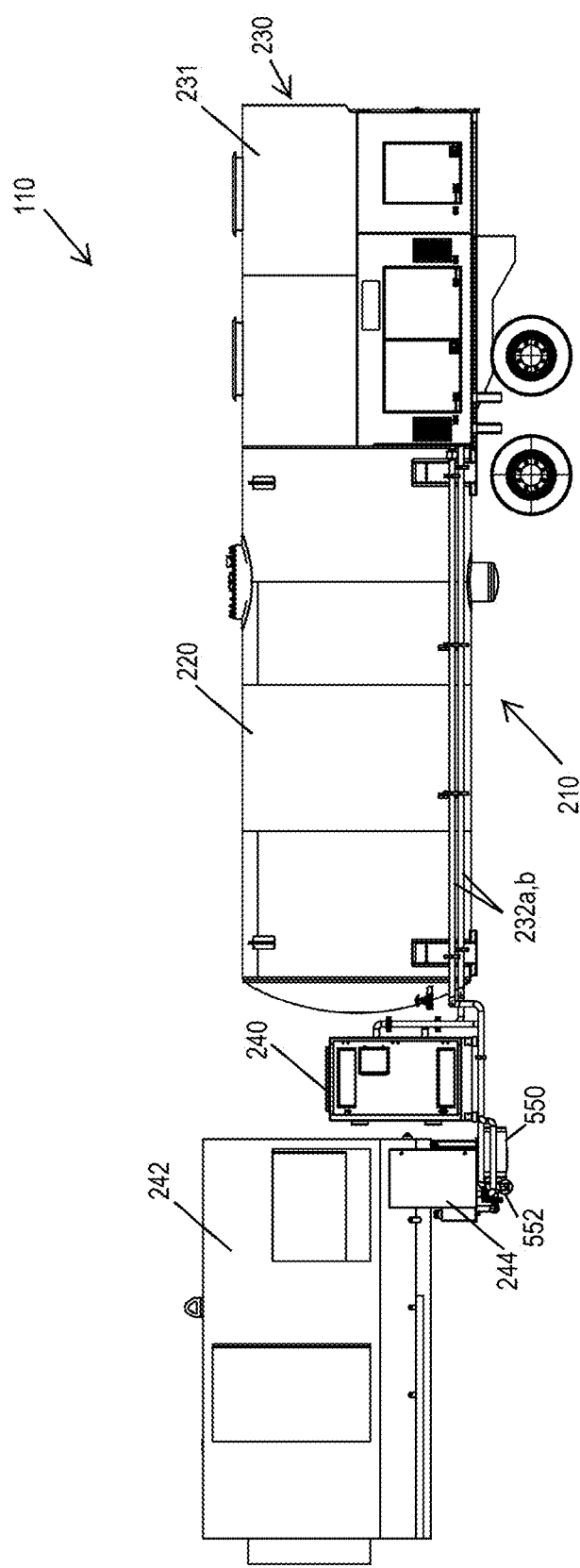
FIG. 3 is an example side plan view of the mobile liquid hydrogen recharger of FIG. 2.

FIG. 3 is a side perspective view of an example embodiment of mobile liquid hydrogen recharger 110. From this perspective, carriage 210, vehicle-mounted tank 220, dispensing system 230, and load bank 240 are all still visible. The location of elements in this view can be different in other embodiments. As illustrated in this example, the fluid lines 232a-b extend from the load bank 240 into the enclosure 231 to provide a heat transfer fluid to the vaporizer 236.

Figure 4A:
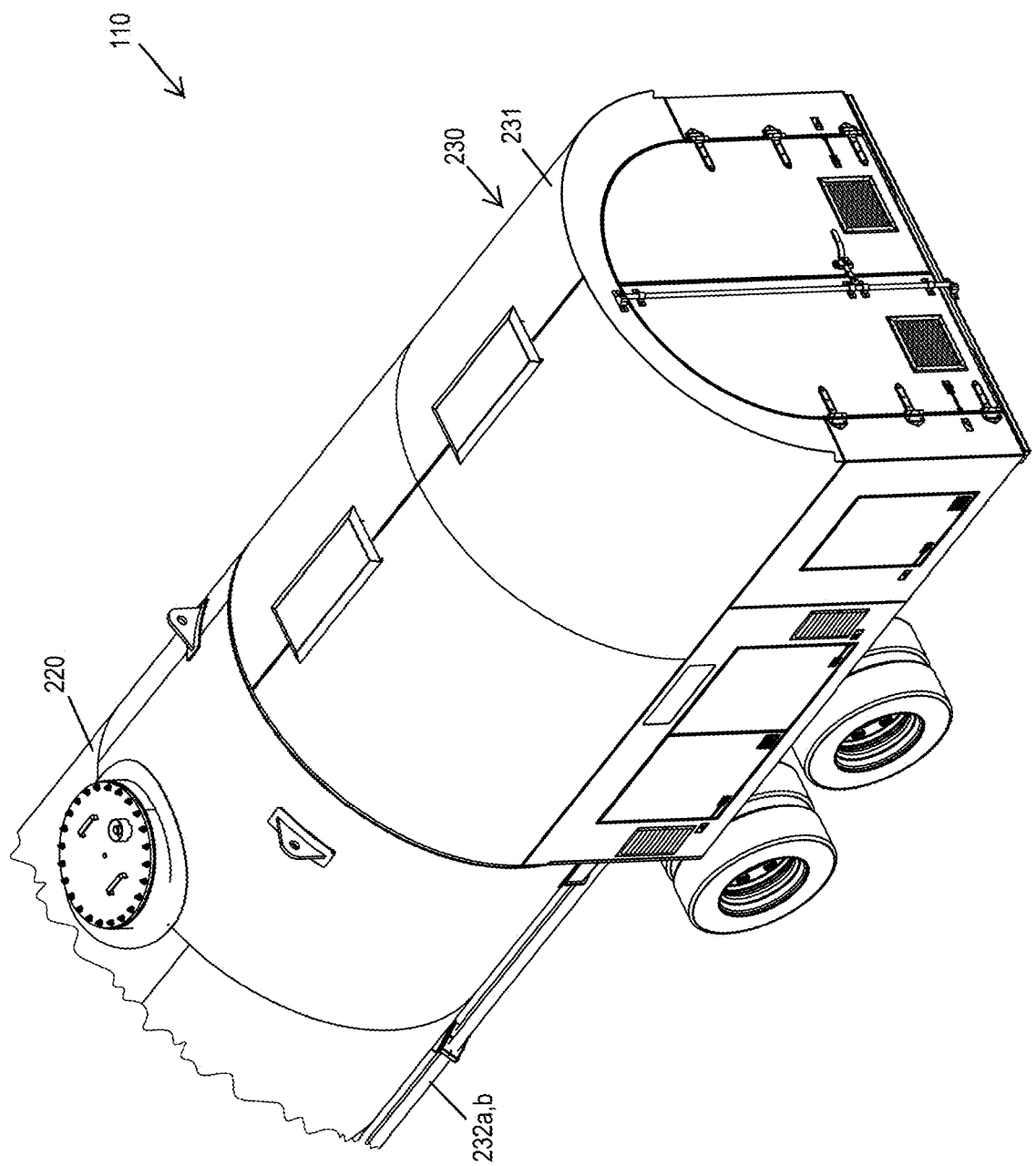
FIGS. 4A-4B are example top perspective views of a portion of the mobile liquid hydrogen recharger of FIG. 2.
Figure 4B:
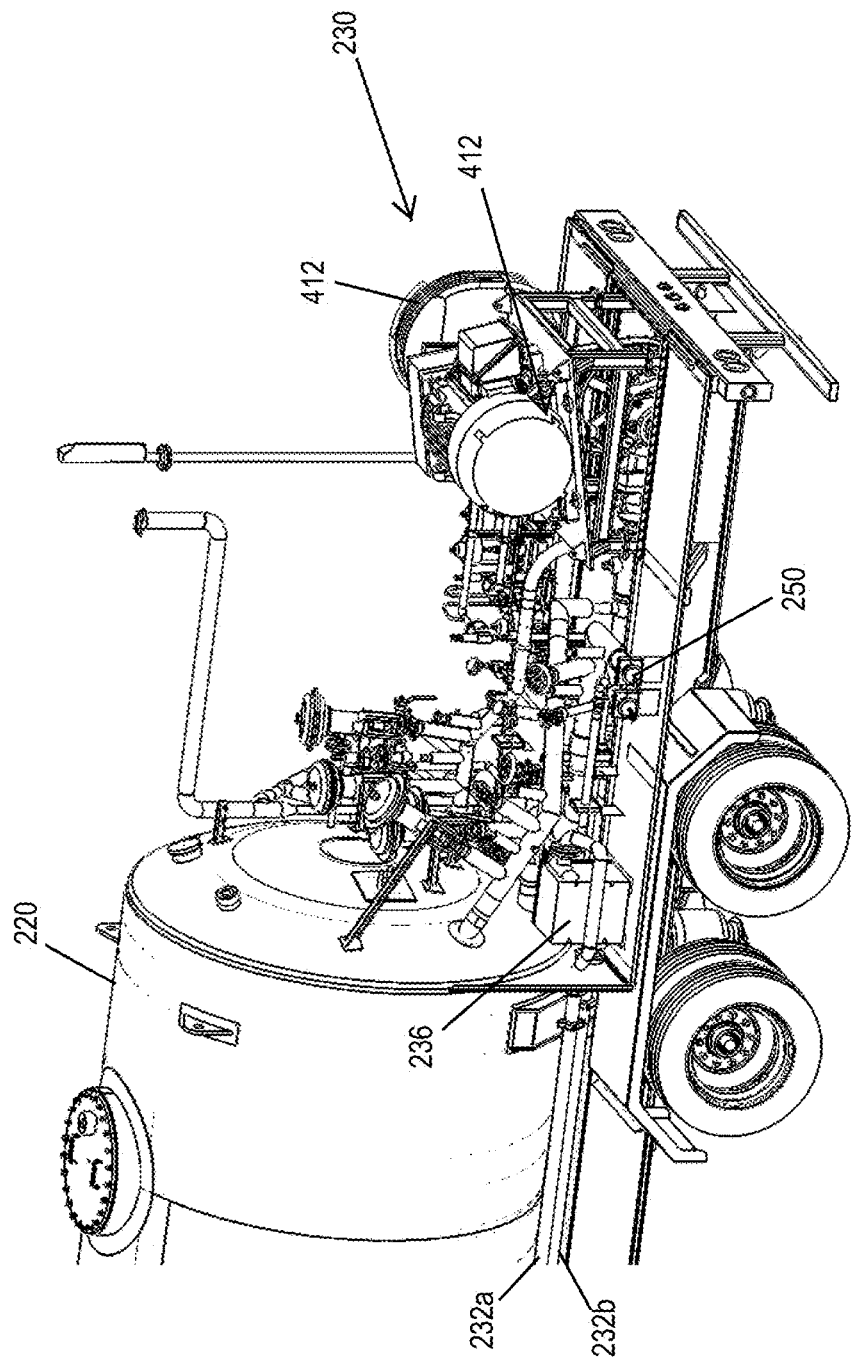

FIGS. 4A-4B illustrate a top perspective view of a portion of the mobile liquid hydrogen recharger 110 including the dispensing system 230, with the enclosure 231 present (in FIG. 4A) and removed (in FIG. 4B). The enclosure 231 has access panels and doors to access the various pumps and components seen in FIG. 4B.

In the example layout specifically seen in FIG. 4B, the dispensing system 230 includes a supply inlet connection 402, an external pump 412, fluid conduit 232a-b, vaporizer 236, and discharge outlet 250.

The supply inlet connection 402 is a valved fluid conduit usable to supply liquid hydrogen to an interior of the mobile tank 220. The supply inlet connection 402 may be used to connect the mobile tank 220 to a supply tank, e.g. supply tank 120 of FIG. 1. The supply inlet connection 402 may be located at the bottom of the mobile tank 220. Connecting the supply inlet connection 402 to a source tank will allow the system to be refilled with hydrogen. The hydrogen could be in liquid or gaseous form.

The external pump 412 is one of a plurality of pumps used within the mobile liquid hydrogen recharger 110, and in particular is downstream of a pump internal to the mobile tank 220. The external pump 412 is fluidically connected to an internal pump, seen schematically within the mobile tank 220 in FIG. 5, and receives liquid hydrogen pumped from the internal pump and routes the liquid hydrogen either in a feedback loop back to the mobile tank 220, or to vaporizer 236 for output to a supply tank to be recharged.

Also shown, the vaporizer 236 is fluidically connected to the external pump 412, and connected to fluid conduit 232a-b. In examples, the fluid conduit 232a-b carry heated fluid received from the load bank 240 to the vaporizer, and provide a return path of fluid from the vaporizer 236 to the load bank 240 for re-heating. The fluid may be, in example embodiments, a coolant, such as glycol, which is heated to a predetermined temperature to assist with change of phase of liquid hydrogen to hydrogen gas. The vaporizer 236 is fluidically connected downstream of the external pump 412, and an outlet from the vaporizer 236 leads to the discharge outlet 250.

Although not shown, electrical connections are provided between the generator 242, control box 244, vaporizer 236, external pump 412, and the internal pump, to provide electrical energy and control signals for operating those respective components.

In example implementations, the discharge outlet 250 may be operable to provide a maximum operating discharge pressure of up to 12,500 PSI; however other discharge pressures may be utilized. Furthermore, a discharge rate of up to 68,000 standard cubic feet per hour may be provided.

The specific discharge pressure and discharge rate used for a re-pressurization operation may be selected via a controller at the control box 244, and may be selected for the particular re-pressurization operation performed, and the specific bulk tank to which the mobile liquid hydrogen recharger 110 is connected. For example, a bulk tank may require re-pressurization to a pressure between 35 and 70 Megapascals (MPa), and have a tank capacity of 50-150 kg. A vehicle hydrogen gas tank may have a tank pressure of approximately 70 MPa, but a tank capacity of only 5 kg. Still further, a hydrogen-powered forklift a have a tank pressure limit of approximately 35 MPa, and a tank capacity of between 1-3 kg. Finally, a hydrogen-powered bus may have a tank pressure limit of approximately 35 MPa, and a tank capacity of about 50 kg. accordingly, output pressure and output gas delivery rate may be varied and selected for a particular re-pressurization operation, but the mobile tank will be of sufficient size to perform multiple re-pressurization operations without requiring a refill of liquid hydrogen.

Figure 5:
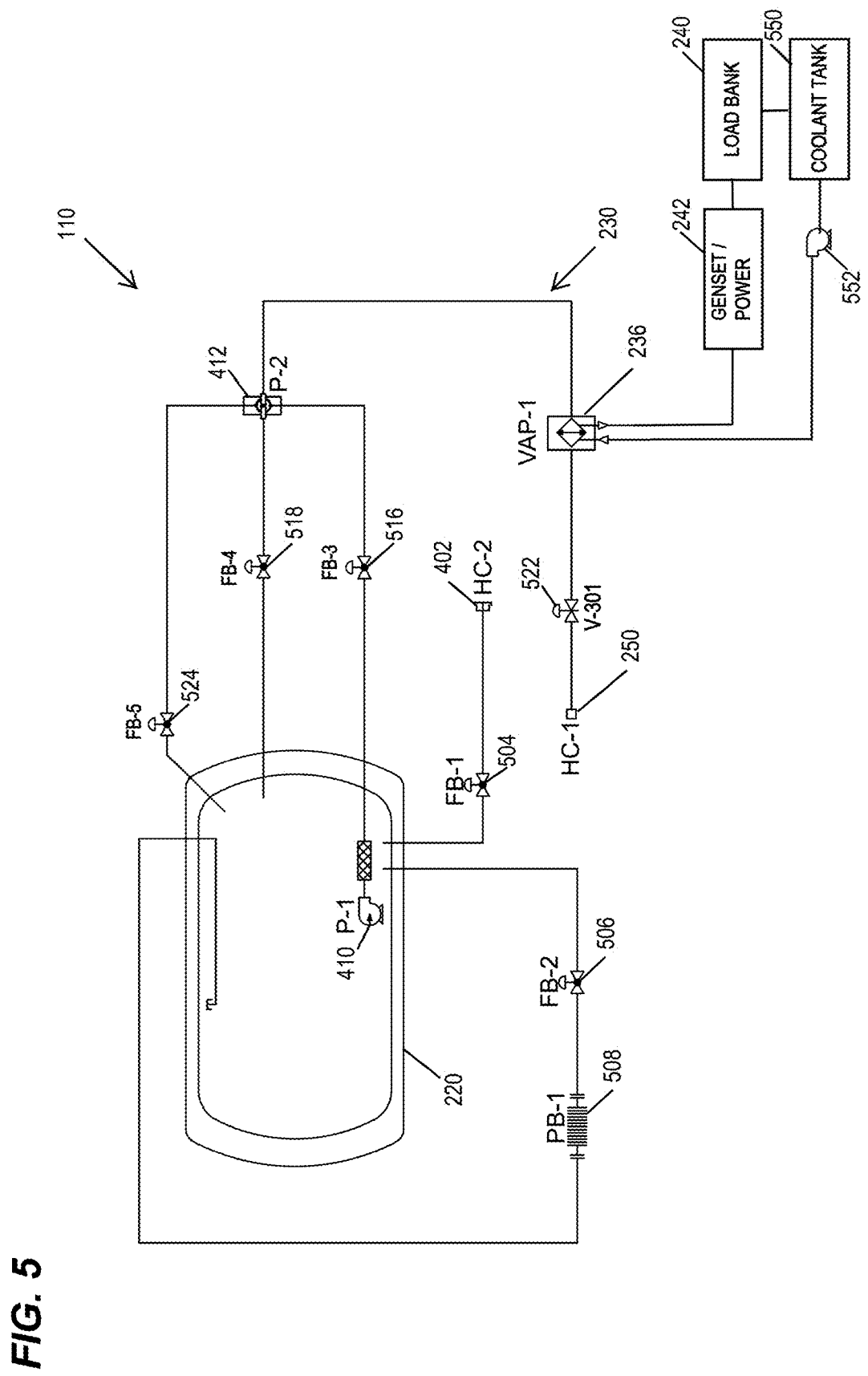
FIG. 5 is an example schematic view of the mobile liquid hydrogen recharger of FIG. 2.

An example schematic diagram of the mobile liquid hydrogen recharger 110 is shown in FIG. 5. In the example embodiment shown, the mobile liquid hydrogen recharger 110 includes mobile tank 220. The mobile tank 220 is configured to store liquid hydrogen, and has integrated therewith a number of feedback mechanisms for maintaining liquid hydrogen at a relatively stable pressure.

One feedback mechanism includes a pressure building circuit that includes a pressure building mechanism 508 and a pressure building valve 506. The pressure building mechanism 508 can consist of any device that is capable of building and maintaining pressure sufficient for the desired need. The mobile liquid hydrogen recharger 110 can use the pressure circuit to maintain a certain pressure and temperature in the mobile tank 220. Maintaining the correct pressure and temperature preserves the hydrogen in a liquid form, which is helpful for transportation. Also, maintaining a controlled pressure allows for the tank to be emptied without concern of the pressure differential between the mobile tank 220 and an external bulk tank used for refill. In further example embodiments, the circuit is able to maintain a pressure within the mobile tank 220 at a desired pressure, up to a tank maximum pressure. In some embodiments, a tank pressure may be selected to be between about 100 PSI and 175 PSI. The liquid hydrogen being delivered to the external pump 412 will be about this pressure as well. In example embodiments, the contents of mobile tank 220 (e.g., the liquid hydrogen) may be maintained at a temperature between −423° F. and −400° F. It is also possible for the system to maintain other temperatures and pressures in other embodiments.

Additionally, the dispensing system 230 includes conduit for both dispensing high-pressure hydrogen gas and a second feedback mechanism for recirculating liquid or gas hydrogen back into the mobile tank 220. Specifically, the dispensing system 230 includes a submergible internal pump 410 positioned within an interior volume of the mobile tank 220. The submergible internal pump 410 may be implemented as a centrifugal pump used to draw liquid hydrogen from an interior volume of the mobile tank 220 and into low pressure fluid conduit, for routing to the external pump 412.

The external pump 412 may be implemented as a high-pressure cryogenic pump, which is configured to deliver liquid hydrogen at a high pressure. It can raise the pressure of liquid hydrogen to a higher pressure relative to the pressure of the liquid hydrogen at the first pump. Dispensing higher pressure hydrogen can be more effective than low pressure since the hydrogen is converted to a gas before dispensing. Also, many of the bulk tanks require the hydrogen to have a high pressure to fill. Liquid hydrogen may be delivered to pump 412 at a pressure between 100 PSI (pounds per square inch) and 175 PSI, and it will be able to raise the pressure between 10000 PSI and 15000 PSI, for example up to about 12,500 PSI. Further it could be a motor driven pump or have some other kind of driving force. These are just a few implementations; others not shown are possible as well.

In example operation, the external pump 412 pressurizes the received hydrogen and routes it either to a vaporizer 236 or via a feedback loop back into the interior volume of the mobile tank 220, via a valve 524. The external pump 412 may be implemented as a high pressure pump having a maximum flow rate of 10 gallons per minute at approximately 10,000 PSI, and a maximum discharge pressure of 12,500 PSI at approximately 150 kg/hour. Other types of high pressure pumps may be utilized as well, based on the specifications and requirements for the bulk tanks to be recharged, as noted above.

In the example shown, the dispensing system 230 additionally includes two extra valves that are fluidically connected between external pump 412 and mobile tank 220. This represents a second feedback loop back to the mobile tank 220. Specifically, once liquid hydrogen reaches external pump 412, it may not be at an appropriate pressure or temperature. Thus, it can be cycled back to the mobile tank 220 through valve 518. The valve 518 may be either a high volume valve or a low-volume valve that only lets a small amount of liquid hydrogen flow back to the mobile tank 220 through its conduit to the mobile tank 220. While in operation to dispense hydrogen gas, in some embodiments, the valve 518 may remain open so some liquid hydrogen can flow back to mobile tank 220. In other embodiments, the valve will close to completely stop flow back to the mobile tank 220. The system may also include more than one valve that can open and close.

In the example shown, the vaporizer 236 obtains heat through the heat transfer fluid (e.g., glycol) passing from the load bank 240 via fluid conduit 232a-b. In example embodiments, the vaporizer 236 includes a heat transfer fluid circuit. The heat transfer fluid circuit contains heat transfer fluid. This fluid can be glycol, coolant, water, or some other fluid that transfers heat, as noted above. This heat transfer fluid is stored in a heat transfer fluid reservoir 550 (seen in FIG. 3), and can be stored hot or cold. A heat transfer fluid circulation pump 552 (also seen in FIG. 3) is also fluidically connected to the reservoir 550. The heat transfer fluid circulation pump 552 drives the fluid circuit and keeps the heat transfer fluid flowing between the load bank 240 and the vaporizer 236. In the present example, pump 552 is a centrifugal pump. Other kinds of pumps are possible as well. Within the vaporizer 236, heat exchangers transfer heat from the heat transfer fluid to the liquid hydrogen, thereby converting the liquid hydrogen to hydrogen gas for recharging operation. The vaporizer may be implemented as, for example, a diffusion bonded compact heat exchanger (DCHE) rated for up to 12 gallons per minute of liquid hydrogen flow at up to 99 MPa. The vaporizer may have integrated thereon a valve to control how much heat the vaporizer transfers. This valve may be a three-way valve to proportion the amount of hot fluid that enters the vaporizer. Controlling the amount of heat allows the system to adapt to the temperature of the liquid hydrogen.

The fluid conduit between the external pump 412 and the vaporizer may generally be maintained at a higher pressure than fluid conduit between the external pump and the mobile tank 220; in example embodiments, tubing downstream of the external pump 412 may be rated for use at up to 15,000 PSI. Downstream of the vaporizer, a pressure release valve 522 maintains pressure within the high-pressure conduit downstream of the external pump 412 below rated limits, by exhausting hydrogen gas (which has changed phase at the vaporizer). The discharge outlet 250 is downstream of the pressure release valve 522, and is connectable to various tanks, such as bulk tanks, to be recharged.

Figure 6:
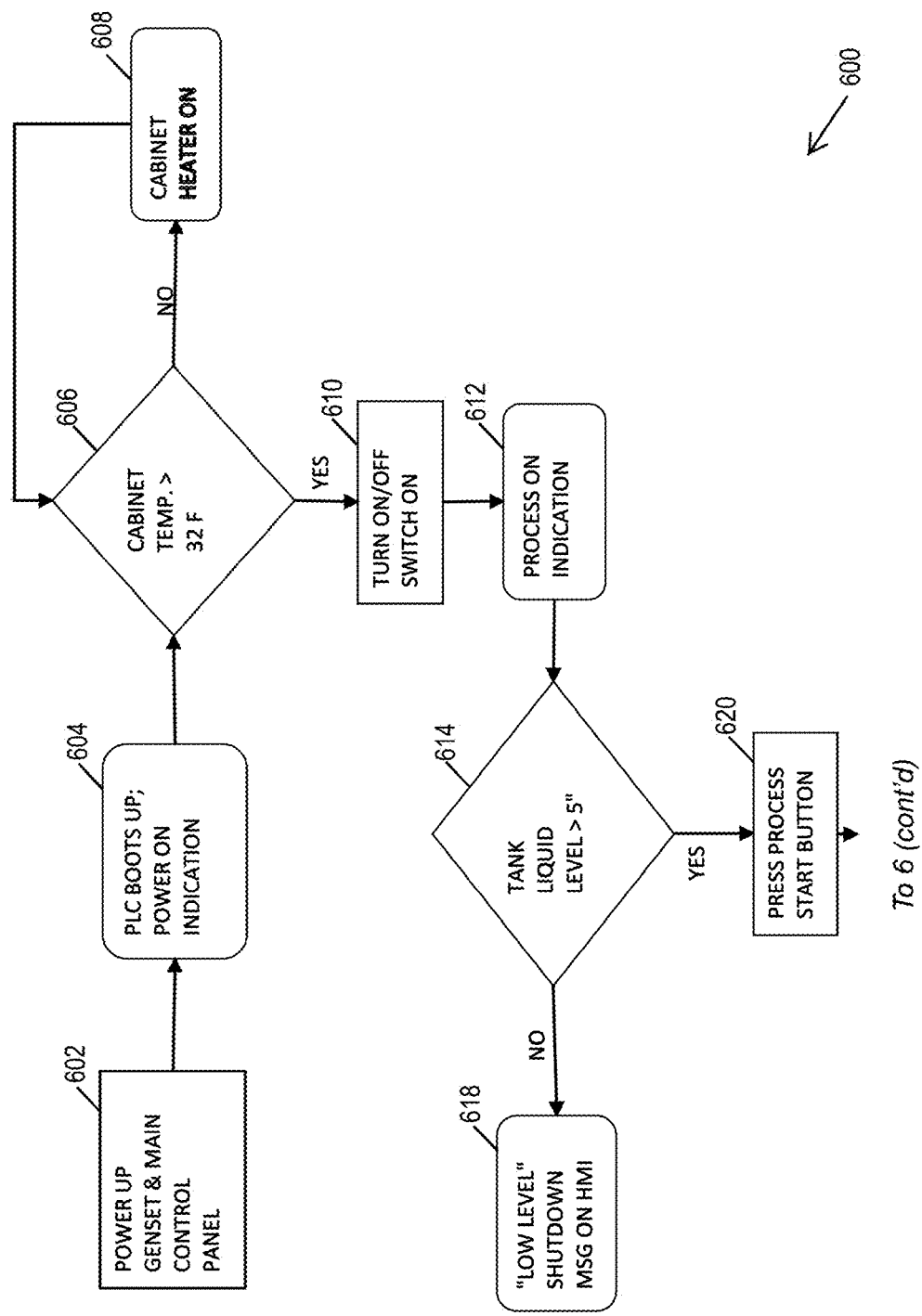
FIG. 6 is a flowchart of an example method of operation of the mobile liquid hydrogen recharger of FIGS. 2-5.
Figure 6:
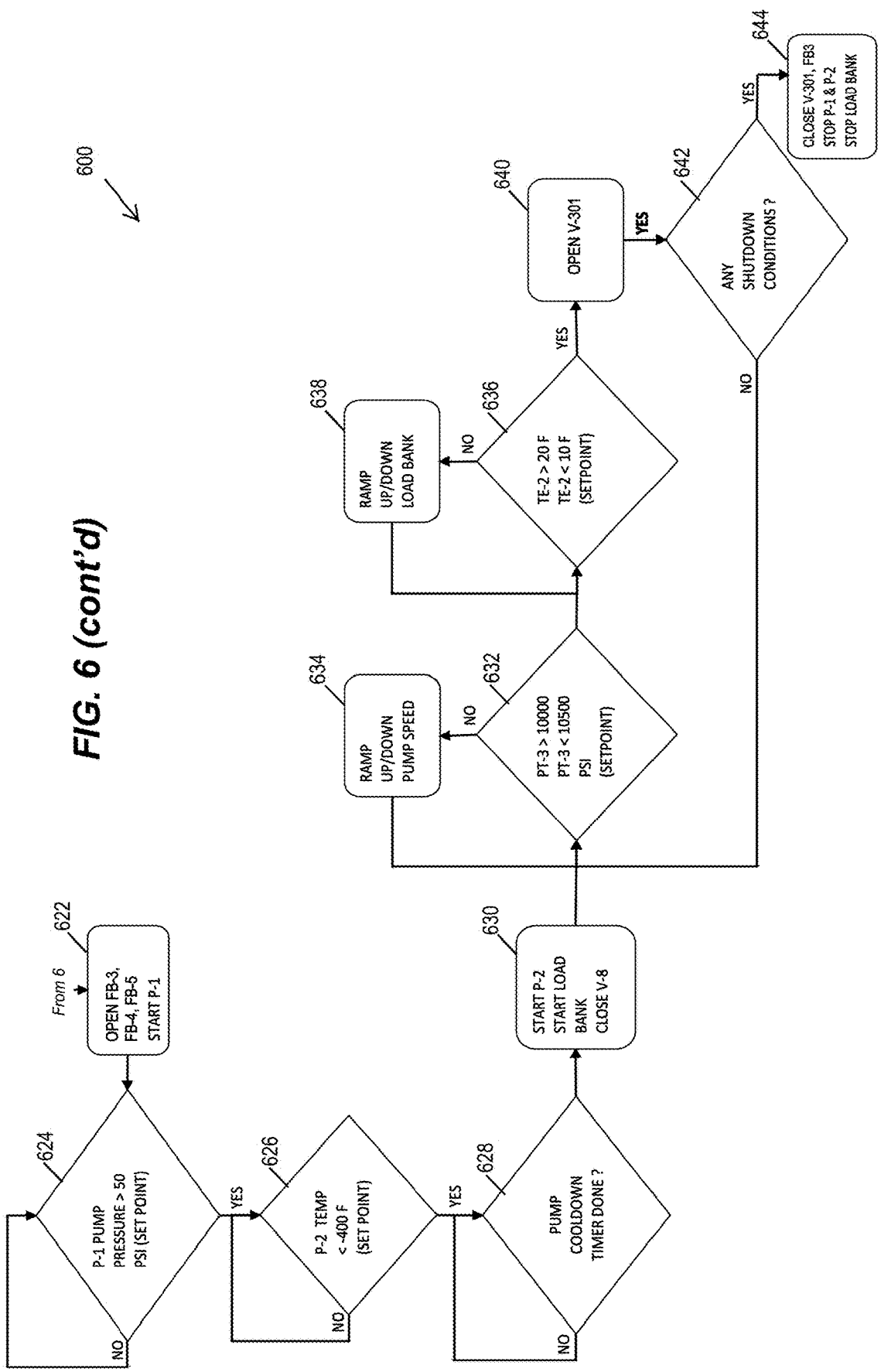

FIG. 6 shows a flowchart of an example operation method 600 for the disclosed mobile liquid hydrogen recharger 110. The method 600 generally corresponds to the steps to operate the mobile liquid hydrogen recharger 110, and may be performed by a controller maintained within control box 244 seen in FIGS. 2-3. The controller may be implemented as a programmable logic controller (PLC), such as an Allen-Bradley PLC supplied by Rockwell Automation of Milwaukee, Wisconsin. The controller, and method 600 generally, can be used with any of the systems in FIGS. 2-5 described above in addition to other aspects or equipment. In some examples, the method 600 can be performed at least in part by a user of such a controller or operator of the mobile liquid hydrogen recharger 110, in addition to operations performed by the controller.

In an example embodiment, the method 600 includes a power on operation (Step 602) which provides power from a generator 242 to the main control panel within control box 244. The method 600 further includes performing a boot up process of the controller (step 604).

In the example shown, the method 600 includes determining whether a cabinet temperature is greater than a predetermined threshold, such as greater than 32° F. (above freezing) (step 606). If the cabinet temperature is below the predetermined threshold, a cabinet heater may be turned on (step 608). Once the cabinet temperature is above the predetermined threshold, an operator may activate the system by turning on a switch (step 610), thereby initiating a process to recharge and external hydrogen gas tank, such as a bulk tank. Optionally, a process indicator, such as a light or user interface, may be eliminated (step 612).

In the example shown, a liquid level within the mobile tank 220 is assessed (step 614). The assessment may determine whether the level of liquid hydrogen within the tank is above a predetermined threshold. In the example shown in FIG. 6, the predetermined threshold is 5 inches in depth (to ensure submersion of the internal pump 410). However, other thresholds may be utilized as well.

If the liquid level within the tank is below the threshold, a low level shut down operation will be performed (step 618). The low level shut down operation may involve displaying a message to a user indicating a low liquid level and halting other operations as may be running at that time. However, if the liquid level within the tank is above a threshold, a user is allowed to press a process start button (step 620) to indicate a beginning of the hydrogen gas recharge process.

In the example shown, the method 600 includes opening a set of valves, including valve 508 and valve 520 to enable feedback and pressure equalization within the mobile tank 220 (step 622). This step further includes starting the internal pump 410 thereby starting a low pressure building within the conduit between the mobile tank 220 and the external pump 412. Notably, maintaining valve 520 in an open position allows for recirculation of liquid hydrogen during the pressure building process.

In the example shown, the method 600 further includes assessing whether a pump pressure exceeds a set point (step 624). The set point corresponds to a target pressure within the conduit between the mobile tank 220 and the external pump 412. If the pressure has not yet reached the set point, pressure is allowed to continue to build. In example embodiments, the set point pressure may be 50 PSI or greater. Other pressures may be utilized as well.

In the example shown, once the pressure set point is reached, the method 600 further includes assessing whether a temperature set point is reached (step 626). The temperature set point is a set point for a temperature of the liquid hydrogen when it reaches the external pump 412, below which operation is appropriate. If a temperature of the liquid hydrogen at external pump is above the set point, the recirculating operation will be allowed to continue until the set point is reached. In example embodiments, the set point may be a temperature below −400° F., and in some instances, between −423° F. and −400° F. Other temperatures or temperature ranges may be used as well, and may be programmed into the controller.

In the example shown, once the temperature set point is reached, the method 600 determines whether a pump cooldown timer has expired (step 628). The pump cooldown timer corresponds to a minimum time during which cooldown is expected to occur. Pump cooldown time may be programmable, and ensures that the system reaches a steady state before dispensing the liquid hydrogen in gas form.

Once the cooldown timer has expired, operation continues by starting the external pump 412, as well as starting operation of the load bank 240 (step 630). This may also include closing the recirculating valve 518, thereby allowing the pressurization provided by the internal pump 410 to provide liquid hydrogen to the external pump 412 for output, rather than for recirculation.

After the external pump 412 and load bank 240 are started, a pressure at an output of the external pump may be assessed, e.g., at the high pressure (downstream) side of the external pump 412 (step 632). In example embodiments, a pressure is assessed downstream of the vaporizer 236, for example upstream of an outlet valve 522. Specifically, it may be determined whether a pressure on the high pressure side of the external pump 412 is within a set point range, for example between 10,000 and 10,500 PSI, for example 12,500 PSI. Other set point ranges may be used and programmed as well. If the pressure downstream of the external pump 412 is not within the set point range, a pump speed of the external pump 412 may be ramped up or down to achieve a target pressure (step 634).

Once a target pressure is reached, a target temperature is assessed, for example downstream of the vaporizer 236 (step 636). In particular, a determination is made as to whether a target temperature is within a set point range, for example between 10° F. and 20° F. Other temperature ranges, or temperatures, may be used as well, typically within a range of −70° F. to 80° F. depending on the selected application and environmental temperature. In a particular example, an operating range of −40° F. to 80° F. may be used. If a temperature downstream of the vaporizer 236 (i.e., of the hydrogen gas) is not within the set point range, electrical power may be adjusted to the load bank 240 (at step 638) to increase or decrease the amount of heat supplied to heat transfer fluid that is delivered to the vaporizer 236. Once the temperature downstream of the vaporizer is within the set point, the outlet valve 522 may be opened (step 640), thereby initiating a re-pressurization process by expelling hydrogen gas.

In the example shown, the controller may, while expelling hydrogen gas, assess whether any shut down conditions are occurring (step 642). Shutdown conditions may include, for example, a low fluid condition, a pressure outside of a safe operating range, a temperature outside of a safe operating range, or other malfunctions within the system. If no shutdown conditions occur, operation may continue by continuing to monitor pressure set points and adjust pump speed (at steps 632, 634) and continuing to monitor temperature set points and adjust load bank power (at steps 636, 638) while maintaining the outlet valve 522 in an open position. If, however, any shut down conditions do occur, the outlet valve 522 is closed, the feedback valve 508 is closed, and both the internal pump 410 and external pump 412 are halted (step 644). Additionally, power is no longer delivered to the load bank, thereby halting heating of the heat transfer fluid.

It is noted that, although the general operational steps are depicted in FIG. 6, additional steps could be included in alternative processes, and that alternative equipment could be used to that discussed herein, in a manner consistent with the present disclosure.

Figure 7:
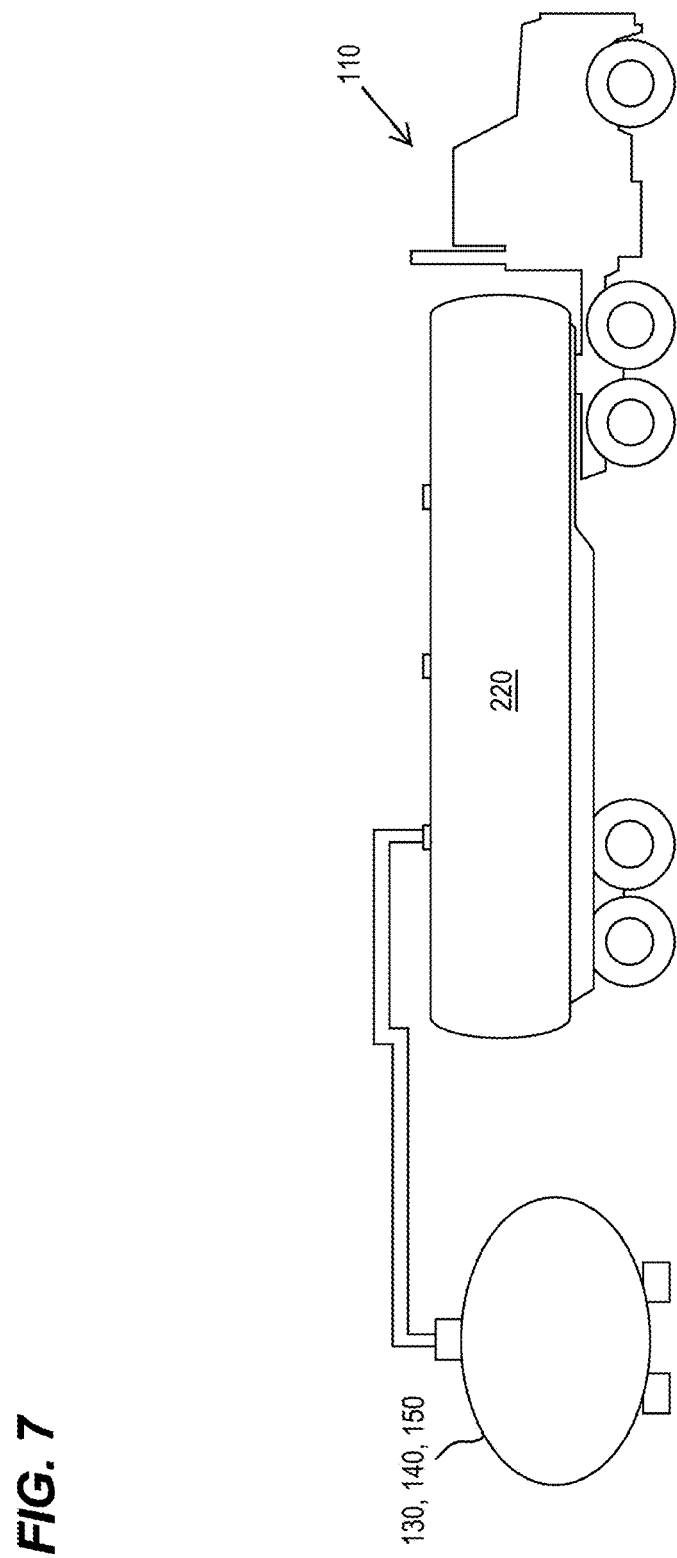
FIG. 7 is a flowchart of an example method of use of a mobile liquid hydrogen recharger, according to example embodiments of the present disclosure.

FIG. 7 shows an environment in which a repressurization process of FIG. 6 may be performed using a mobile liquid hydrogen recharger 110. As shown, the mobile liquid hydrogen recharger 110 is transported to a location of a bulk tank 130, 140, 150. Subsequently, a bulk tank recharge process, also referred to herein as a repressurization process, is performed, using the steps described above in conjunction with FIG. 6, and the dispensing system 230 described in conjunction with FIGS. 2-5. The method includes transporting a mobile hydrogen recharge system containing liquid hydrogen in a mobile tank to a first bulk tank 710. Next, the system performs a first bulk tank recharge process 720. That process would include fluidically connecting the first bulk tank to an outlet of the mobile hydrogen recharge system 722. Then, the method includes pumping liquid hydrogen in the mobile tank from a first pump to a second pump 724. Next, the system pumps the liquid hydrogen to a vaporizer from the second pump 726. After pumping the hydrogen to the vaporizer, step 728 includes raising the temperature of the liquid hydrogen to a temperature above an evaporation point for hydrogen. This step converts the liquid hydrogen to a gas. At step 730, the method concludes by discharging the hydrogen gas through the outlet to the first bulk tank or other external source.

Generally speaking, the method described above in conjunction with FIGS. 6-7 may be repeated. Specifically, a method can include transporting the mobile liquid hydrogen recharger 110 to a second bulk tank remote from the first bulk tank, specifically, without refilling the mobile tank of the mobile liquid hydrogen recharger 110. The second bulk tank would be in a different location from the first. Once there, the mobile liquid hydrogen recharger 110 will perform the same recharging process, thus filling the second bulk tank. The method may further include filling the mobile tank of the mobile liquid hydrogen recharger 110 with liquid hydrogen at a source tank (e.g., tank 120). The source tank would be connected to the mobile liquid hydrogen recharger 110 through an external port that is connected to an internal inlet in the mobile tank 220 of the mobile liquid hydrogen recharger 110. Then, the source tank would dispense hydrogen into the mobile recharge system's tank through the external port. The mobile recharge system can then transport the hydrogen to more bulk tanks and perform the same recharge process.

Referring to FIGS. 1-7 generally, it is noted that the mobile liquid hydrogen recharger 110 of the present disclosure has a number of advantages over existing mobile bulk tank refueling systems. While such existing systems are limited to carrying pressurized hydrogen gas tanks and performing pressure equalization refill processes at those bulk tank locations, the present recharger may perform multiple bulk tank re-pressurization operations using phase conversion of liquid hydrogen to hydrogen gas. It is further noted, that where required, the mobile liquid hydrogen recharger 110 may be used with hydrogen gas within the mobile tank 220, for performing a pressure equalization-based recharging operation. In such arrangements, operation may be similar to that described above, although use of a vaporizer to cause a phase change from liquid hydrogen to hydrogen gas may be unnecessary.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the claimed invention and the general inventive concept embodied in this application that do not depart from the broader scope.

The invention claimed is:

1. A mobile hydrogen recharge system comprising:
    a vehicle-mounted tank for storing liquid hydrogen, the tank having an interior volume;
    a first pump contained within the tank;
    a second pump external to the tank;
    a first fluid conduit fluidically connected between the first pump and the second pump;
    a second fluid conduit fluidically connected between the second pump and an outlet;
    a third fluid conduit that is different than the first fluid conduit, the third fluid conduit fluidically connected between the second pump and the interior volume of the tank, the third fluid conduit configured to facilitate flowback of at least a portion of the liquid hydrogen back to the tank when the liquid hydrogen does not meet particular pressure and temperature thresholds;
    a vaporizer fluidically connected along the second conduit downstream of the second pump external to the tank, the vaporizer having a heat transfer fluid circuit, wherein the vaporizer is operable to raise a temperature of liquid hydrogen received downstream of the second pump from a temperature that is below an evaporation point of the liquid hydrogen to a temperature above the evaporation point of the, thereby converting the liquid hydrogen to a hydrogen gas; and
    a discharge valve fluidically connected between the second pump and the outlet downstream of the vaporizer along the second conduit.

2. The mobile hydrogen recharge system of claim 1, wherein the first pump comprises a submergible pump positioned within the tank.

3. The mobile hydrogen recharge system of claim 1, further comprising a movable carriage.

4. The mobile hydrogen recharge system of claim 1, wherein the vehicle-mounted tank is connectable to different vehicles.

5. The mobile hydrogen recharge system of claim 1 further comprising:
    a first valve at the second pump fluidically connected to the vehicle-mounted tank; and
    a second valve at the second pump fluidically connected to the vehicle-mounted tank.

6. The mobile hydrogen recharge system of claim 1, wherein the second pump increases a pressure within the second conduit relative to a pressure within the first conduit.

7. The mobile hydrogen recharge system of claim 1, wherein the second pump comprises a high-pressure liquid hydrogen pump.

8. The mobile hydrogen recharge system of claim 7, wherein the second pump is configured to deliver the liquid hydrogen to the vaporizer at a pressure of up to 12,500 PSI and at a temperature between −423° F. and −400° F.

9. The mobile hydrogen recharge system of claim 8, wherein, in response to opening the discharge valve, gaseous hydrogen is discharged from the outlet at up to 12,500 PSI and at a temperature between −40° F. and 80° F.

10. The mobile hydrogen recharge system of claim 1, further comprising a liquid hydrogen recharge valve fluidically connected between a fluid refill port external to the tank and an inlet opening positioned within the interior volume of the tank.

11. The mobile hydrogen recharge system of claim 10, wherein the inlet is positioned within a bottom portion of the tank.

12. The mobile hydrogen recharge system of claim 1, wherein the vaporizer heat transfer fluid circuit comprises:
    a heat exchanger positioned along the second conduit;
    a heat transfer fluid reservoir fluidically connected to the heat exchanger via a heat transfer fluid circuit;
    a load bank positioned along the heat transfer fluid circuit; and
    a heat transfer fluid circulation pump positioned along the heat transfer fluid circuit.

13. The mobile hydrogen recharge system and the vaporizer of claim 12, wherein the load bank uses at least one of engine heat and electrical heat to increase the temperature of the heat transfer fluid.

14. The mobile hydrogen recharge system of claim 1, further comprising a pressure building circuit, wherein the pressure building circuit maintains a pressure in the vehicle-mounted tank within a range of pressures selected to preserve the liquid hydrogen as a liquid.

15. The mobile hydrogen recharge system of claim 14, wherein the pressure of the liquid hydrogen in the vehicle-mounted tank is up to 150 PSI and the temperature of the liquid hydrogen in the vehicle-mounted tank is between −423° F. and −400° F.

16. A method of operation for a mobile hydrogen recharge system comprising:
    opening a valve fluidically connected along a first conduit between a first pump within a vehicle-mounted tank containing liquid hydrogen and a second pump external to the vehicle-mounted tank;
    actuating the first pump to deliver the liquid hydrogen from the first pump to the second pump;
    when the liquid hydrogen meets particular pressure and temperature thresholds, actuating the second pump to deliver the liquid hydrogen, in either liquid or vapor form, from the second pump to a vaporizer along a second conduit and when the liquid hydrogen does not meet the particular pressure and temperature thresholds, actuating the second pump to facilitate the flowback of at least a portion of the liquid hydrogen back to the tank along a third conduit that is fluidically connected between the second pump and a interior volume of the tank and wherein the third conduit is different from the first conduit;
    heating the liquid hydrogen at the vaporizer until it reaches an evaporation point and becomes hydrogen gas; and
    discharging the hydrogen gas through an outlet downstream of the vaporizer along the second conduit to an external source.

17. The method of operation for a mobile hydrogen recharge system of claim 16, wherein heating the liquid hydrogen at the vaporizer comprises passing the liquid hydrogen through at least one heat exchanger, the at least one heat exchanger being fluidically connected to a fluid circuit having a heat transfer fluid that is heated via a load bank.

18. The method of operation for a mobile hydrogen recharge system of claim 17, further comprising increasing pressure of the liquid hydrogen downstream of the second pump within the second conduit.

19. A method for recharging hydrogen bulk tanks, the method comprising:
    transporting a mobile hydrogen recharge system including a mobile tank containing liquid hydrogen in the mobile tank to a first bulk tank;
    performing a first bulk tank recharge process at the first bulk tank, the first bulk tank recharge process comprising:
        fluidically connecting the first bulk tank to an outlet of the mobile hydrogen recharge system;
        pumping liquid hydrogen in the mobile tank from a first pump to a second pump;
        when the liquid hydrogen meets particular pressure and temperature thresholds, pumping the liquid hydrogen to a vaporizer from the second pump and when the liquid hydrogen does not meet the particular pressure and temperature thresholds, pumping, from the second pump, at least a portion of the liquid hydrogen back to the mobile tank along a conduit that is fluidically connected between the second pump and an interior volume of the mobile tank;
        raising the temperature of the liquid hydrogen at the vaporizer to a temperature above an evaporation point from a temperature below the evaporation point, thereby converting the liquid hydrogen to a hydrogen gas; and
        discharging the hydrogen gas through the outlet to the first bulk tank.

20. The method of claim 19, further comprising:
    transporting the mobile hydrogen recharge system from the first bulk tank to a second bulk tank remote from the first bulk tank; and
    without refilling the mobile tank after discharging the hydrogen gas through the outlet to the first bulk tank, performing a second bulk tank recharge process at the second bulk tank.

* * * * *